United States Patent                (10) Patent No.:     US 7,499,127 B2
Shibasaki et al.                         (45) Date of Patent:         Mar. 3, 2009

(54) LIQUID CRYSTAL DISPLAY DEVICE HAVING RED, GREEN AND BLUE FILTERS IN WHICH THE LIQUID CRYSTAL LAYER THICKNESS FOR THE RED FILTER PORTION IS EQUAL TO THE GREEN FILTER PORTION BUT GREATER THAN THE BLUE FILTER PORTION

(75) Inventors: Masakazu Shibasaki, Kawasaki (JP); Hidefumi Yoshida, Kawasaki (JP); Kazuya Ueda, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 267 days.

(21) Appl. No.: 11/071,599

(22) Filed: Mar. 2, 2005

(65) Prior Publication Data

US 2006/0061718 A1    Mar. 23, 2006

(30) Foreign Application Priority Data

Sep. 21, 2004    (JP) ............................. 2004-273148

(51) Int. Cl.
*G02F 1/1335*    (2006.01)
(52) U.S. Cl. ...................... 349/107; 349/117; 349/118; 349/119
(58) Field of Classification Search ................ 349/106, 349/107, 117, 118, 119
See application file for complete search history.

(56) References Cited

U.S. PATENT DOCUMENTS 5,150,235 A * 9/1992 Haim et al. ................. 349/107
5,235,450 A * 8/1993 Yoshimura et al. .......... 349/120
5,499,126 A * 3/1996 Abileah et al. .............. 349/106
5,844,649 A * 12/1998 Yamahara et al. ........... 349/118
6,141,075 A * 10/2000 Ohmuro et al. ............. 349/130
6,281,956 B1   8/2001 Ohmuro et al.
6,661,488 B1   12/2003 Takeda et al.
7,057,684 B2 * 6/2006 Ishihara et al. .............. 349/107
7,057,689 B2   6/2006 Terashita et al.
7,075,600 B2 * 7/2006 Song et al. .................. 349/107
2001/0030726 A1   10/2001 Yoshida et al.

FOREIGN PATENT DOCUMENTS

JP        3027805        1/2000
JP        2002-182036    6/2002
JP        3330574        7/2002

* cited by examiner

*Primary Examiner*—David Nelms
*Assistant Examiner*—John Heyman
(74) *Attorney, Agent, or Firm*—Greer, Burns & Crain, Ltd.

(57) ABSTRACT

First and second polarization plates are disposed on both sides of a liquid crystal panel in which thicknesses of a liquid crystal layer are set up depending on colors of color filters. Then, a first retardation film is disposed between the liquid crystal panel and the first polarization film, and a second retardation film is disposed between the liquid crystal panel and the second polarization film. Assuming that a maximum value of a refractive index in an in-plane direction out of principal indices of refraction is Nx, that a refractive index in an orthogonal direction to the direction of the refractive index which has the value of Nx is Ny, and that a thickness is d, the first and second retardation films are set to satisfy a difference in values of (Nx−Ny)×d equal to or less than 10 nm.

6 Claims, 8 Drawing Sheets

$Nx=Ny>Nz$ $Nx>Ny=Nz$

LIQUID CRYSTAL DISPLAY DEVICE HAVING RED, GREEN AND BLUE FILTERS IN WHICH THE LIQUID CRYSTAL LAYER THICKNESS FOR THE RED FILTER PORTION IS EQUAL TO THE GREEN FILTER PORTION BUT GREATER THAN THE BLUE FILTER PORTION

CROSS-REFERENCE TO RELATED APPLICATIONS

This application is based on and claims priority of Japanese Patent Application No. 2004-273148 filed on Sep. 21, 2004, the entire contents of which are incorporated herein by reference.

BACKGROUND OF THE INVENTION

1. Field of the Invention

The present invention relates to a liquid crystal display device of a multi-gap mode configured to set a thickness of a liquid crystal layer for each color of a color filter.

2. Description of the Prior Art

As compared to a cathode ray tube (CRT), a liquid crystal display device has advantages in that it is small in thickness and weight, and low in driving voltage and power consumption. For this reason, liquid crystal display devices are applied to various electronic devices including televisions, notebook personal computers (PCs), desktop PCs, personal digital assistants (PDAs), cellular telephones, and the like. In particular, an active matrix liquid crystal display device provided with thin film transistors (TFTs) as switching elements for respective picture elements (sub pixels) exerts excellent display characteristics almost equal to a CRT owing to high driving performances. Accordingly, active matrix liquid crystal display devices are now used in various fields, such as desktop PCs and televisions, where CRTs have been conventionally applied.

In general, a liquid crystal display device includes two substrates and liquid crystal which is sealed between these substrates. Picture element electrodes, TFTs, and the like are formed for respective picture elements on one of the substrates. Meanwhile, color filters opposed to the picture element electrodes, and a common electrode common to the respective picture elements are formed on the other substrate. In this specification, the substrate including formation of the picture element electrodes and the TFTs will be hereinafter referred to as a TFT substrate, and the substrate to be disposed opposite to the TFT substrate will be hereinafter referred to as a counter substrate. Moreover, a structure formed by sealing the liquid crystal between the TFT substrate and the counter substrate will be hereinafter referred to as a liquid crystal panel.

Conventionally, a twisted nematic (TN) liquid crystal display device, which is configured to seal horizontal alignment type liquid crystal (liquid crystal having positive dielectric constant anisotropy) between two substrates and to subject liquid crystal molecules to twisted alignment, has been widely used. However, the twisted nematic liquid crystal display device has a disadvantage of a poor view angle characteristic where contrast and color tone vary largely when a screen is viewed from an inclined angle. For this reason, a multi-domain vertical alignment (MVA) liquid crystal display device having a more favorable view angle characteristic than the TN liquid crystal display device has been developed and put into practical use. In the MVA liquid crystal display device, vertical alignment type liquid crystal (liquid crystal having negative dielectric constant anisotropy) is sealed between a TFT substrate and a counter substrate, and a plurality of regions, having mutually different alignment orientations of liquid crystal molecules upon application of a voltage are formed in one picture element.

Although the MVA liquid crystal display device has a more favorable display characteristic than the TN liquid crystal display device, the MVA liquid crystal display device still has a disadvantage of reduction in contrast when a screen is viewed from a certain direction (from obliquely above, for example). To solve this disadvantage, as disclosed in Japanese Patent Publications Nos. 3027805 and 3330574, and in Japanese Unexamined Patent Publication No. 2002-182036, a liquid crystal display device configured to dispose an optical compensation film (a retardation film) between a liquid crystal panel and a polarization plate has been developed and put into practical use.

FIG. 1 is a schematic diagram showing a configuration of a MVA liquid crystal display device disclosed in Japanese Patent Publication No. 3027805. As described above, a liquid crystal panel 10 is configured to seal vertical alignment type liquid crystal between a TFT substrate and a counter substrate. A polarization plate 11 is disposed on one of surfaces (which is on the lower side in FIG. 1) of this liquid crystal panel 10, and a polarization plate 12 is disposed on the other side (which is on the upper side in FIG. 1). Absorption axes of these polarization plates 11 and 12 are mutually orthogonalized.

Viewed from the liquid crystal panel 10 side, a retardation film 13 and a retardation film 14 are sequentially disposed between the liquid crystal panel 10 and the polarization plate 12. Assuming that refractive indices in the X direction, the Y direction (these are the in-plane directions), and the Z direction (the thickness direction) are Nx, Ny, and Nz, respectively, the retardation film 13 has positive refractive index anisotropy which satisfies Nx>Ny=Nz. On the contrary, assuming that refractive indices in the X direction, the Y direction, and the Z direction are Nx, Ny, and Nz, respectively, the retardation film 14 has negative refractive index anisotropy which satisfies Nx=Ny>Nz.

Incidentally, there has been disclosed a multi-gap liquid crystal display device, in which the thicknesses of a liquid crystal layer (cell gaps) in a red (R) picture element, a green (G) picture element, and a blue (B) picture element are adjusted by the thicknesses of color filters in order to correct differences in optical rotations of liquid crystal molecules which vary depending on optical wavelengths. In this type of the multi-gap liquid crystal display device, the thicknesses of the liquid crystal layer for the respective picture elements are set to satisfy the relation of the blue picture element <the green picture element the red picture element, for example. In this way, a color representation characteristic particularly in a multiple tone display is improved.

However, in the multi-gap liquid crystal display device, it is considered difficult to improve a view angle characteristic by use of the retardation films. The reason will be described below.

When a phase difference in the in-plane direction (the X direction or the Y direction) of the retardation film is Rin and a phase difference in the thickness direction (the Z direction) thereof is Rth, the values Rin and Rth will be defined by the following formulae (1) and (2):

$$Rin = (Nx - Ny) \times d \quad (1)$$

$$Rth = ((Nx + Ny)/2 - Nz) \times d \quad (2)$$

Here, d is the thickness of the retardation film. Optimal values of the phase difference Rin in the in-plane direction and the phase difference Rth in the thickness direction has a correlation with retardation possessed by the liquid crystal layer. The retardation RLC of the liquid crystal layer will be calculated by the following formula (3):

$$RLC = \Delta n \times dk \quad (3)$$

Here, Δn is a difference in the refractive indices of the liquid crystal layer between extraordinary ray and ordinary ray, and dk is the thickness of the liquid crystal layer.

However, as described previously, the thicknesses of the liquid crystal layer vary depending on the colors of the color filters in the multi-gap liquid crystal display device. Accordingly, the values of retardation of the liquid crystal layers vary among the red picture element, the green picture element, and the blue picture element. Therefore, optimal conditions of the retardation film also vary among the red picture element, the green picture element, and the blue picture element.

The retardation film is generally formed by stretching a polymeric film.

Accordingly, the phase difference Rin in the in-plane direction and the phase difference Rth in the thickness direction are uniform, and it is extremely difficult to partially change the phase difference Rin in the in-plane direction and the phase difference Rth in the thickness direction. Therefore, even when the phase difference Rin in the in-plane direction and the phase difference Rth in the thickness direction are for example set appropriately for the red picture element, the light will pass through in an oblique direction in the green picture element or the blue picture element. In this case, a portion supposed to be seen actually in black will be observed in green or blue in the green picture element or the blue picture element. In addition, the color in that portion may change depending on the viewing angle.

SUMMARY OF THE INVENTION

In consideration of the foregoing problem, it is an object of the present invention to provide a multi-gap liquid crystal display device, which is capable of suppressing a phenomenon of coloring of a portion supposed to be in black when the portion is viewed obliquely, and of providing more favorable display quality than a conventional liquid crystal display device.

The above-described problem will be solved by a liquid crystal display device including a liquid crystal panel in which thicknesses of a liquid crystal layer are set up depending on colors of color filters, first and second polarization plates disposed so as to interpose the liquid crystal panel, a first retardation film disposed between the liquid crystal panel and the first polarization plate, and a second retardation film disposed between the liquid crystal panel and the second polarization plate. Here, assuming that a maximum value of a refractive index in an in-plane direction out of principal indices of refraction is Nx, that a refractive index in an orthogonal direction to the direction of the refractive index which has the value of Nx is Ny, and that a thickness is d, the first and second retardation films are set to satisfy a difference in values of (Nx−Ny)×d equal to or less than 10 nm.

The inventors of the present invention carried out various experiments and researches for improving the display quality of the multi-gap liquid crystal display device. As a result, the inventors have found out a fact that peak directions of passage of light are almost the same in spite of a change in the thicknesses of the liquid crystal layer by means of providing the retardation films on both sides of the liquid crystal panel and setting the difference in the values of (Nx−Ny)×d equal to or less than 10 nm between these retardation films.

For example, light transmitted through a red color filter will have a red color, light transmitted through a green color filter will have a green color, and light transmitted through a blue color filter will have a blue color. Here, if the peak directions of passage of the light in respective colors are the same, these light components will be mixed together and will turn into an achromatic color. In this way, it is possible to suppress the phenomenon of coloring the portion supposed to be in black when the portion is viewed obliquely, and thereby to improve the display quality.

DESCRIPTION OF THE PREFERRED EMBODIMENTS

Now, preferred embodiments of the present invention will be described with reference to the accompanying drawings.

First Embodiment

Figure 1:
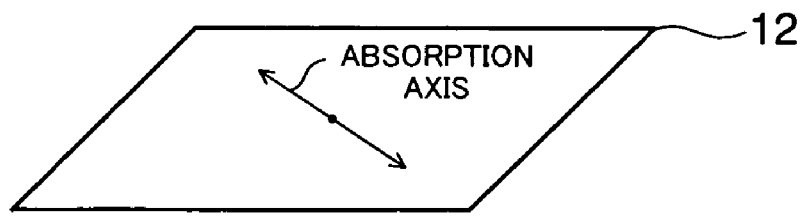
FIG. 1 is a schematic diagram showing a configuration of a conventional liquid crystal display device.
Figure 1:
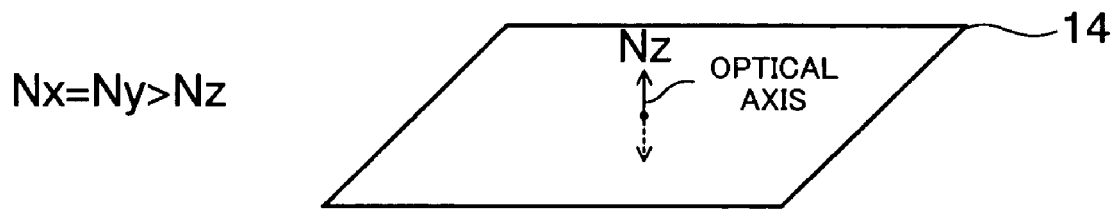
Figure 1:
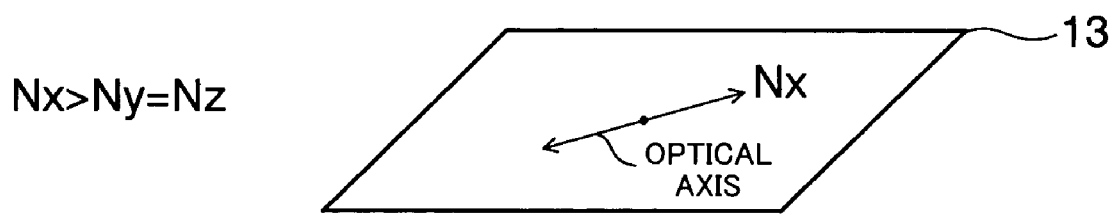
Figure 1:
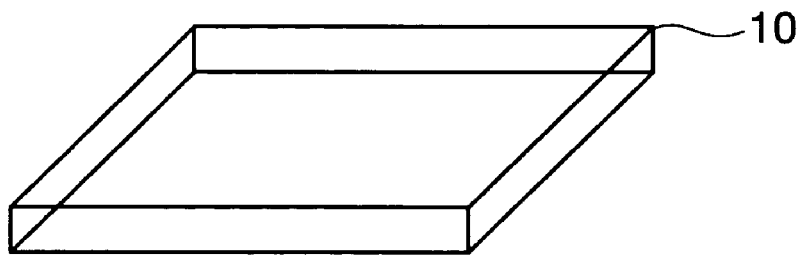
Figure 1:
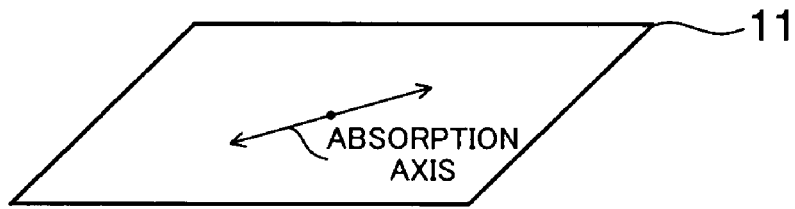
Figure 2:
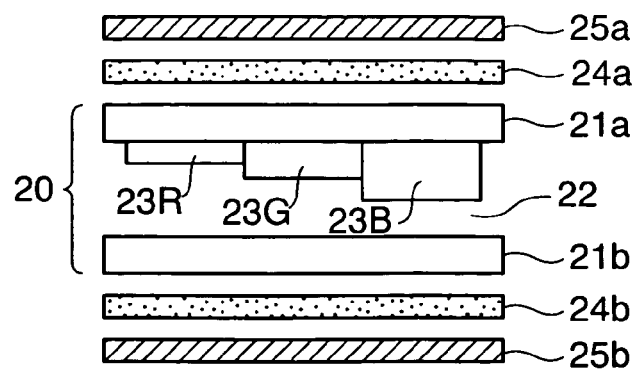
FIG. 2 is a schematic diagram showing a configuration of a liquid crystal display device according to a first embodiment of the present invention.

FIG. 2 is a schematic diagram showing a structure of a multi-gap liquid crystal display device according to a first embodiment of the present invention.

As shown in FIG. 2, the liquid crystal display device of this embodiment includes a liquid crystal panel 20, a pair of polarization plates 25a and 25b disposed so as to interpose the liquid crystal panel 20, a retardation film 24a disposed between the liquid crystal panel 20 and the polarization plate 25a, and a retardation film 24b disposed between the liquid crystal panel 20 and the polarization plate 25b. Moreover, a backlight unit (not shown) is disposed on one side of the liquid crystal panel 20 (on a backside) as a light source.

The liquid crystal panel 20 includes first and second substrates 21a and 21b, and a liquid crystal layer 22 made of liquid crystal having negative dielectric constant anisotropy and sealed between the substrates 21a and 21b. Red picture elements on which red color filters 23R are disposed, green picture elements on which green color filters 23G are disposed, and blue picture elements on which blue color filters 23B are disposed, are arranged on the substrate 21a in the predetermined order. Three adjacent picture elements in red, green, and blue collectively constitute a pixel, which enables various color displays.

Here, the blue color filter 23B is the thickest, then the green color filter 23G is the second thickest, and the red color filter 23R is the thinnest. Correspondingly, the thickness of the liquid crystal layer is reduced in the order of the red picture element, the green picture element, and the blue picture element (the liquid crystal layer in the red picture element >the liquid crystal layer in the green liquid crystal layer >the liquid crystal layer in the blue element). Normally, the color filters 23R, 23G, and 23B are formed on a counter substrate. However, these color filters may be formed on a TFT substrate.

The polarization plates 25a and 25b are disposed to orthogonalize absorption axes to each other. Moreover, a slow axis of the retardation film 24a is disposed orthogonally to the absorption axis of the adjacent polarization plate 25a, and a slow axis of the retardation film 24b is disposed orthogonally to the absorption axis of the adjacent polarization plate 25b.

Each of the retardation films 24a and 24b has positive refractive index anisotropy which satisfies Nx>Ny=Nz on the assumption that a maximum value of a refractive index in an in-plane direction is Nx, that a refractive index in an orthogonal direction to the direction of the refractive index which has the value of Nx is Ny, and that a refractive index in a thickness direction is Nz. Moreover, assuming that a thickness of each of the retardation films 24a and 24b is d, each of the retardation films 24a and 24b needs to satisfy a phase difference in the in-plane direction, i.e. a difference in values of (Nx−Ny)× d, to be equal to or less than 10 nm.

However, when the retardation films 24a and 24b include a combination of a plurality of films, the sum of vectors of phase differences in the in-plane direction and the sum of vectors of phase differences in the thickness direction of these films will be respectively defined as the phase differences in the in-plane direction and the phase differences in the thickness direction of the retardation films 24a and 24b. Normally, a protection layer made of a high molecular polymer film is provided on a surface of each of the polarization films 25a and 25b, and the protection film has a phase difference in the in-plane direction and a phase difference in the thickness direction as well. Therefore, upon calculation of the phase difference in the in-plane direction, it is necessary to consider the protection layers of the polarization plates 25a and 25b as part of the retardation films 24a and 24b.

In the liquid crystal display device of this embodiment, when a voltage is not applied to the liquid crystal layer, liquid crystal molecules are aligned almost perpendicularly to the surfaces of substrates, whereby light is not transmitted in the direction perpendicular to the front surface (a normal line direction) of the liquid crystal panel. Accordingly, the liquid crystal device comes to a black display mode in this case.

Here, a simulation calculation result of an amount of light passage in oblique directions in the black display mode will be described. Here, it is to be noted that each of the retardation films 24a and 24b is designed to have a phase difference Rin in the in-plane direction equal to 30 nm (Rin=30 nm) and a phase difference Rth in the thickness direction equal to 120 nm (Rth=120 nm). Moreover, a difference in refractive indices (a difference in refractive indices between extraordinary ray and ordinary ray) Δn of the liquid crystal layer 22 is set equal to 0.08 (Δn=0.08).

Figure 3:
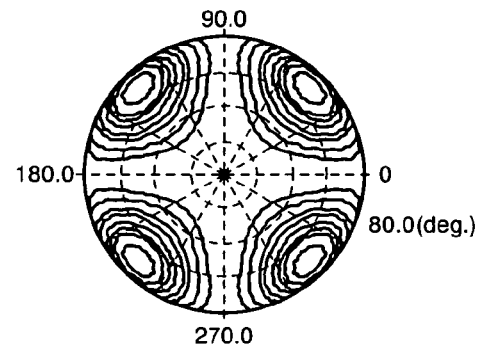
FIG. 3 is a view showing a simulation calculation result of an amount of light passage in a liquid crystal display device having the thickness of a liquid crystal layer equal to 5 μm, where retardation films are disposed on both sides of a liquid crystal panel.
Figure 4:
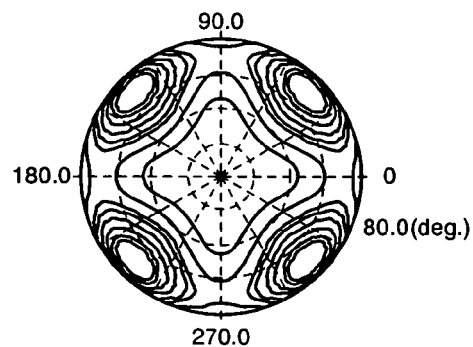
FIG. 4 is a view showing a simulation calculation result of an amount of light passage in the liquid crystal display device having the thickness of the liquid crystal layer equal to 4 μm, where the retardation films are disposed on both sides of the liquid crystal panel.
Figure 5:
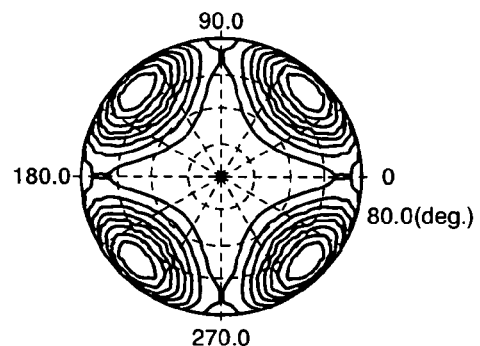
FIG. 5 is a view showing a simulation calculation result of an amount of light passage in the liquid crystal display device having the thickness of the liquid crystal layer equal to 3 μm, where the retardation films are disposed on both sides of the liquid crystal panel.

FIG. 3 is a view showing a simulation calculation result of an amount of light passage in the liquid crystal display device having the thickness of the liquid crystal layer equal to 5 µm. FIG. 4 is a view showing a simulation calculation result of the amount of light passage in the liquid crystal display device having the thickness of the liquid crystal layer equal to 4 µm. FIG. 5 is a view showing a simulation calculation result of the amount of light passage in the liquid crystal display device having the thickness of the liquid crystal layer equal to 3 µm. Note that the difference in the values of (Nx−Ny)×d between the retardation films 24a and 24b is set to 0.

In the following explanation, an angle in a circumferential direction with respect to a horizontal direction (an X direction) on a plane of the liquid crystal panel as a standard (0°) will be referred to as an azimuth, and an angle indicating an inclination with respect to the normal line direction of the liquid crystal panel as a standard (0°) will be referred to as a polar angle. Moreover, in terms of FIG. 3 to FIG. 5, circles drawn in dashed lines indicate positions where the polar angles are 20°, 40°, and 60°, respectively, and the outermost circle indicates a position where the polar angle is 80°. In addition, each contour in FIG. 3 to FIG. 5 is a line joining points of the same amount of light passage.

As apparent from FIG. 3, when the thickness of the liquid crystal layer 22 is equal to 5 μm, peaks of light passage are observed in the directions of the azimuths of about 45°, about 135°, about 225°, and about 315°, and in the direction of the polar angle of about 70°. Moreover, as apparent from FIG. 4 and FIG. 5, when the thickness of the liquid crystal layer is equal to 4 μm or 3 μm as well, peaks of light passage are observed in the directions of the azimuths of about 45°, about 135°, about 225°, and about 315°, and in the direction of the polar angle of about 70°.

As described above, in the liquid crystal display device of this embodiment, the difference in the values of (Nx−Ny)×d between the retardation films 24a and 24b is set to 0. Accordingly, the directions of the peaks of light passage do not change largely in spite of the change in the thicknesses of the liquid crystal layer. That is, the directions of the peaks of light passage are substantially the same even when the thicknesses of the color filters 23R, 23G, and 23B (the thicknesses of the liquid crystal layer in the red picture element, the green picture element, and the blue picture element) are different from one another. The light transmitted through the red color filter will have a red color, the light transmitted through the green color filter will have a green color, and the light transmitted through the blue color filter will have a blue color. However, in the liquid crystal display device of this embodiment, these light components are mixed together and turn into an achromatic color when viewed as a whole. In this way, the light passage becomes inconspicuous, and favorable display quality is thereby obtained.

A relation between the directions of peaks of light passage and the thickness of the liquid crystal layer was also investigated in the case where the retardation films disposed on both sides of the liquid crystal layer 22 have mutually different in-plane phase differences Rin. As a result, it was made clear that the directions of the peaks of light passage do not change largely in spite of the change in the thicknesses of the liquid crystal layer if the difference in the value of the in-plane phase differences Rin between the respective retardation films is equal to or less than 10 nm, and that chromatic colors of red, blue, and the like are hardly observed in the black display mode.

Now, results of investigations concerning relations between the azimuth and the amount of light passage when the differences of the in-plane phase differences Rin of the retardation films are equal to 0 nm, 10 nm, and 20 nm will be described below.

FIG. 6 to FIG. 9 are graphs showing the amount of light passage in the directions of the azimuth in a range from 0° to 90° and at the polar angle of 70° in terms of the liquid crystal panel where the retardation films are disposed on both sides of the liquid crystal layer 22. The amounts of light passage are represented by relative values on the assumption that the peak value of the amount of light passage is set to 1 depending on the thickness of the liquid crystal layer. Here, the amounts of light passage were calculated while setting the thicknesses of the liquid crystal layer equal to 3 μm, 4 μm, and 5 μm.

Figure 6:
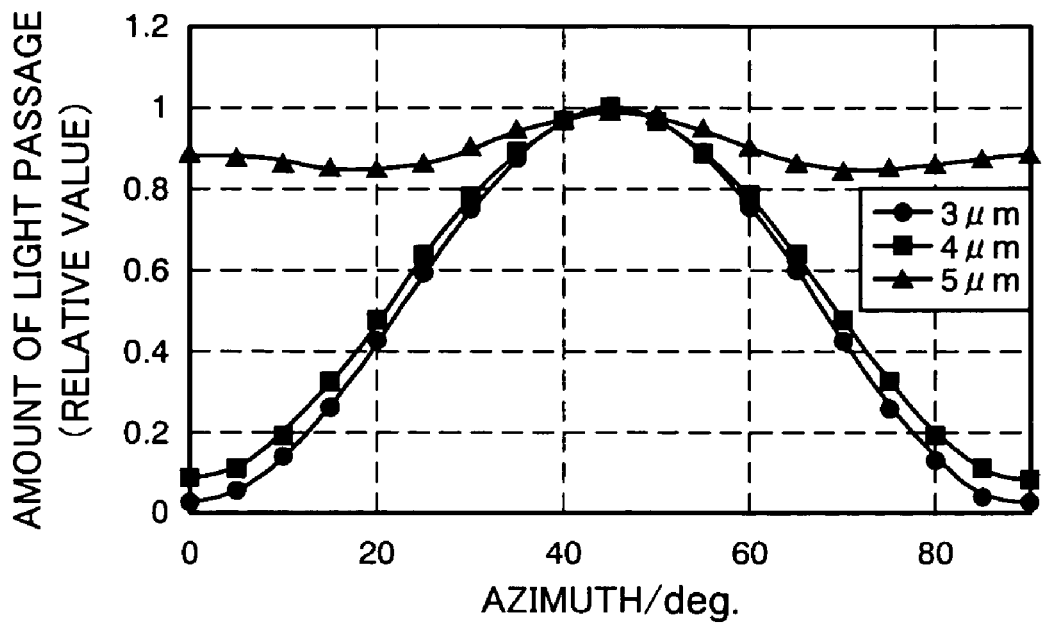
FIG. 6 is a graph showing a relation between an azimuth and an amount of light passage in the liquid crystal display device including the retardation films disposed on both sides of the liquid crystal panel, where values of in-plane phase differences of retardation films are equal.
Figure 7:
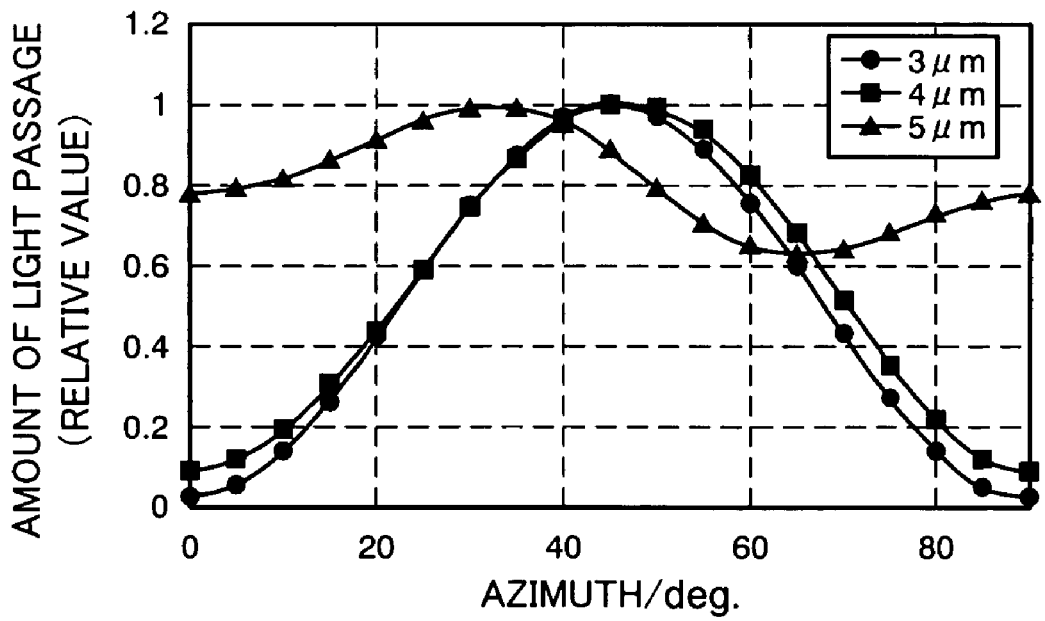
FIG. 7 is a graph showing a relation between the azimuth and the amount of light passage in the liquid crystal display device including the retardation films disposed on both sides of the liquid crystal panel, where the values of in-plane phase differences of retardation films have a difference of 10 nm.
Figure 8:
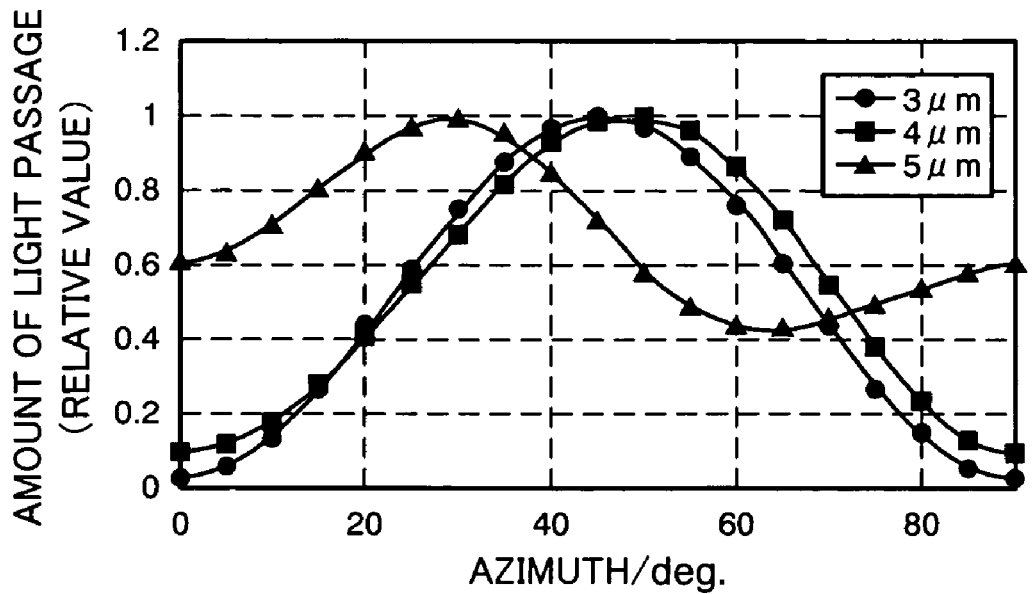
FIG. 8 is a graph showing a relation between the azimuth and the amount of light passage in the liquid crystal display device including the retardation films disposed on both sides of the liquid crystal panel, where the values of in-plane phase differences of retardation films have a difference of 20 nm.
Figure 9:
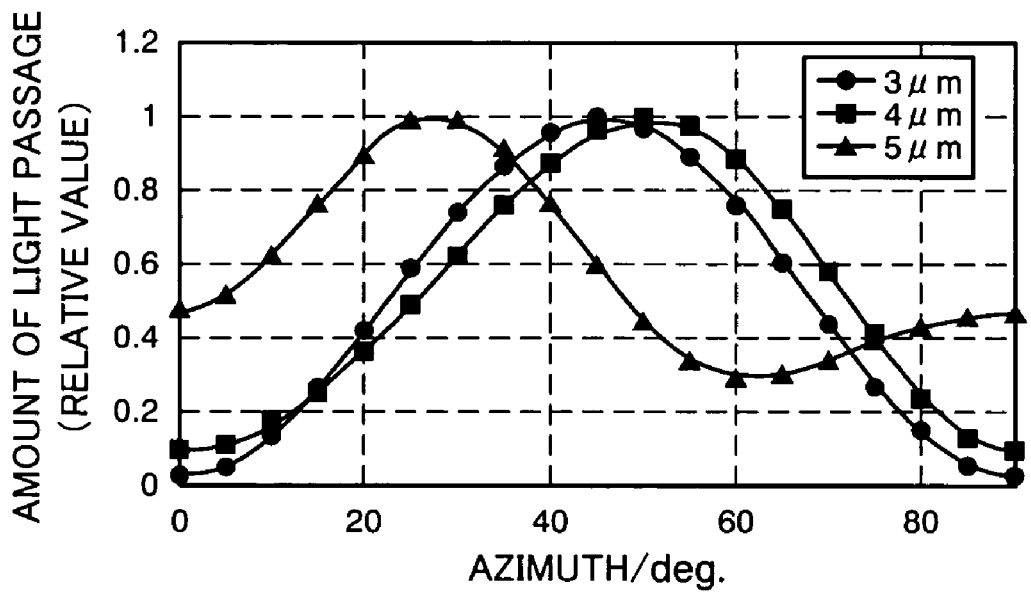
FIG. 9 is a graph showing a relation between the azimuth and the amount of light passage in the liquid crystal display device including the retardation films disposed on both sides of the liquid crystal panel, where the values of in-plane phase differences of retardation films have a difference of 30 nm.

FIG. 6 is the graph showing the amounts of light passage when the in-plane phase differences Rin of the retardation films 24a and 24b are mutually equal (Rin=30 nm for both of the retardation films 24a and 24b). FIG. 7 is the graph showing the amounts of light passage when difference in the in-plane phase the differences Rin between the retardation films 24a and 24b is equal to 10 nm (Rin=25 nm for the retardation film 24a and Rin=35 nm in the retardation film 24b). FIG. 8 is the graph showing the amounts of light passage when the difference in the in-plane phase differences Rin between the retardation films 24a and 24b is equal to 20 nm (Rin=20 nm for the retardation film 24a and Rin=40 nm for the retardation film 24b). FIG. 9 is the graph showing the amounts of light passage when the difference in the in-plane phase differences Rin between the retardation films 24a and 24b is equal to 30 nm (Rin=15 nm for the retardation film 24a and Rin=45 nm for the retardation film 24b).

As apparent from FIG. 6, when the in-plane differences Rin of the retardation films 24a and 24b are mutually equal, peak positions of the amounts of light passage are substantially the same in the direction of the azimuth of about 45° irrespective of whether the thickness of the liquid crystal layer is equal to 3 μm, 4 μm or 5 μm. Therefore, as described previously with reference to FIG. 3 to FIG. 5, the directions of the peaks of light passage are substantially the same even when the thicknesses of the color filters 23R, 23G, and 23B are different from one another. The light transmitted through the red color filter will have a red color, the light transmitted through the green color filter will have a green color, and the light transmitted through the blue color filter will have a blue color. However, in the liquid crystal display device of this embodiment, these light components are mixed together and turn into an achromatic color when viewed as a whole. In this way, the light passage becomes inconspicuous, and favorable display quality is thereby obtained.

Meanwhile, as apparent from FIG. 7, when the difference in the in-plane differences Rin of the retardation films 24a and 24b is equal to 10 nm, the peak positions of the amounts of light passage are oriented in the direction of the azimuth of about 45° when the thickness of the liquid crystal layer is equal to 3 μm or 4 μm. Meanwhile, the peak position of the amount of light passage is oriented in the direction of the azimuth of about 35° when the thickness of the liquid crystal layer is equal to 5 μm. In this way, when the difference in the in-plane phase differences is equal to 10 nm, the peak positions of light passage are deviated by about 10° depending on the thicknesses of the liquid crystal layer. When the peak positions of light passage are shifted depending on the thicknesses of the liquid crystal layer, the light components in red, green, and blue are not mixed together and do not turn into an achromatic color. However, such coloring is indiscernible to the naked eye, and it is hard to tell a difference from an achromatic color.

Moreover, as apparent from FIG. 8, when the difference in the in-plane differences Rin of the retardation films 24a and 24b is equal to 20 nm, the peak position of the amount of light passage is oriented in the direction of the azimuth of about 45° when the thickness of the liquid crystal layer is equal to 3 μm. Meanwhile, the peak position of the amount of light passage is oriented in the direction of the azimuth of about 50° when the thickness of the liquid crystal layer is equal to 4 μm, and the peak position of the amount of light passage is oriented in the direction of the azimuth of about 30° when the thickness of the liquid crystal layer is equal to 5 μm. In this way, when the difference in the in-plane phase differences is equal to 20 nm, the peak positions of light passage are deviated by about 20° at the maximum depending on the thicknesses of the liquid crystal layer. When the peak positions of light passage are deviated by about 20°, the light components in red, green, and blue are not mixed together. As a result, a color is visible to a portion supposed to be in the black display.

Furthermore, as apparent from FIG. 9, when the difference in the in-plane differences Rin of the retardation films 24a and 24b is equal to 30 nm, the peak position of the amount of light passage is oriented in the direction of the azimuth of about 45° when the thickness of the liquid crystal layer is equal to 3 μm. Meanwhile, the peak position of the amount of light passage is oriented in the direction of the azimuth of about 50° when the thickness of the liquid crystal layer is equal to 4 μm, and the peak position of the amount of light passage is oriented in the direction of the azimuth of about 25° when the thickness of the liquid crystal layer is equal to 5 μm. In this way, when the difference in the in-plane phase differences is equal to 30 nm, the peak positions of light passage are deviated by about 25° at the maximum depending on the thicknesses of the liquid crystal layer. In this case as well, since the peak positions of light passage are shifted by 20° or more, the portion supposed to be in the black display will bear a color.

As described above, when the difference in the in-plane phase difference Rin between the retardation films 24a and 24b is equal to or below 10 nm, the deviation in the peak positions of light passage will be lower than about 10°. Accordingly, when this liquid crystal panel is viewed from an oblique direction, a slight color at the portion supposed to be in the black display is indiscernible to the naked eye. Hence, it is possible to obtain favorable display quality.

Figure 10:
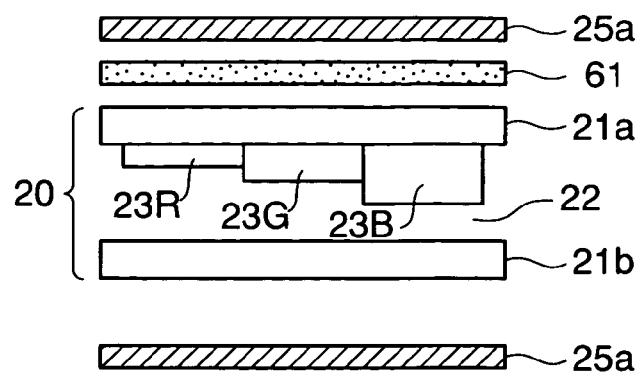
FIG. 10 is a schematic diagram showing a configuration of a liquid crystal display device according to a comparative example.

In the meantime, as shown in FIG. 10, simulation calculation of an amount of light passage in oblique directions in the black display mode was carried out in terms of a liquid crystal display device in which a retardation film 61 is disposed on only one surface (which is on an upper side of a substrate 21a in the drawing) of the liquid crystal panel 20 for the purpose of comparison. Here, it is to be noted that the phase difference Rin in the in-plane direction of the retardation film 61 was set equal to 60 nm (Rin=60 nm) and the phase difference Rth in the thickness direction was set equal to 240 nm (Rth=240 nm). Moreover, the difference in refractive indices Δn of the liquid crystal layer 22 was set equal to 0.08.

Figure 11:
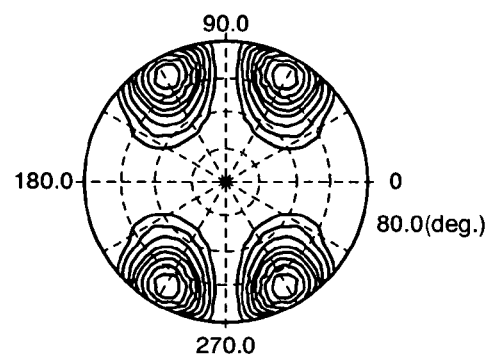
FIG. 11 is a view showing a simulation calculation result of an amount of light passage in a liquid crystal display device having the thickness of a liquid crystal layer equal to 5 μm, where a retardation film is disposed on only one side of a liquid crystal panel.
Figure 12:
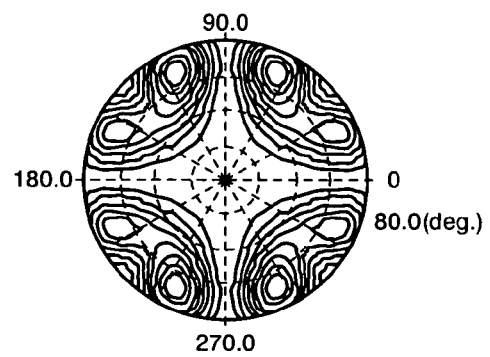
FIG. 12 is a view showing a simulation calculation result of an amount of light passage in the liquid crystal display device having the thickness of the liquid crystal layer equal to 4 µm, where the retardation film is disposed on only one side of the liquid crystal panel.
Figure 13:
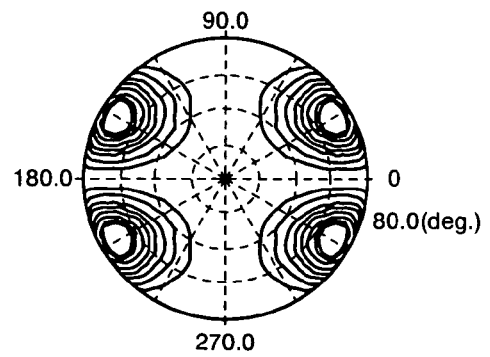
FIG. 13 is a view showing a simulation calculation result of an amount of light passage in the liquid crystal display device having the thickness of the liquid crystal layer equal to 3 µm, where the retardation film is disposed on only one side of the liquid crystal panel.

FIG. 11 is a view showing a simulation calculation result of an amount of light passage in the liquid crystal display device having the thickness of the liquid crystal layer 22 equal to 5 μm. FIG. 12 is a view showing a simulation calculation result of the amount of light passage in the liquid crystal display device having the thickness of the liquid crystal layer 22 equal to 4 μm. FIG. 13 is a view showing a simulation calculation result of the amount of light passage in the liquid crystal display device having the thickness of the liquid crystal layer 22 equal to 3 μm.

As apparent from FIG. 11, when the thickness of the liquid crystal layer 22 is equal to 5 μm, peaks of light passage are observed in the directions of the azimuths of about 60°, about 120°, about 240°, and about 300°, and in the direction of the polar angle of about 70°. Moreover, as apparent from FIG. 12, when the thickness of the liquid crystal layer 22 is equal to 4 μm, peaks of light passage are observed in the directions of the azimuths of about 65°, about 115°, about 245°, and about 295°, and in the direction of the polar angle of about 70°. Furthermore, as apparent from FIG. 13, when the thickness of the liquid crystal layer 22 is equal to 3 μm, peaks of light passage are observed in the directions of the azimuths of about 30°, about 150°, about 210°, and about 330°, and in the direction of the polar angle of about 70°. As described above, in the liquid crystal display device including the retardation film having the positive dielectric anisotropy on only one side of the liquid crystal panel, the directions of the peaks of light passage largely change along with changes in the thicknesses of the liquid crystal layer. Therefore, when this structure is applied to a multi-gap liquid crystal display device, a color such as blue or red is visible to a portion supposed to be in black when the liquid crystal panel is viewed obliquely. In addition, the color may change depending on the viewpoint.

Now, a result of investigation of display characteristics by means of a liquid crystal display device of this embodiment, which is actually manufactured, will be described below.

Firstly, a 15-inch XGA (1024×768 pixels, and a pixel pitch of 297 μm) liquid crystal panel is prepared. This liquid crystal panel has a structure in which liquid crystal having negative dielectric constant anisotropy (made by Merck, Δn=0.08) is sealed between a TFT substrate and a counter substrate.

Figure 14:
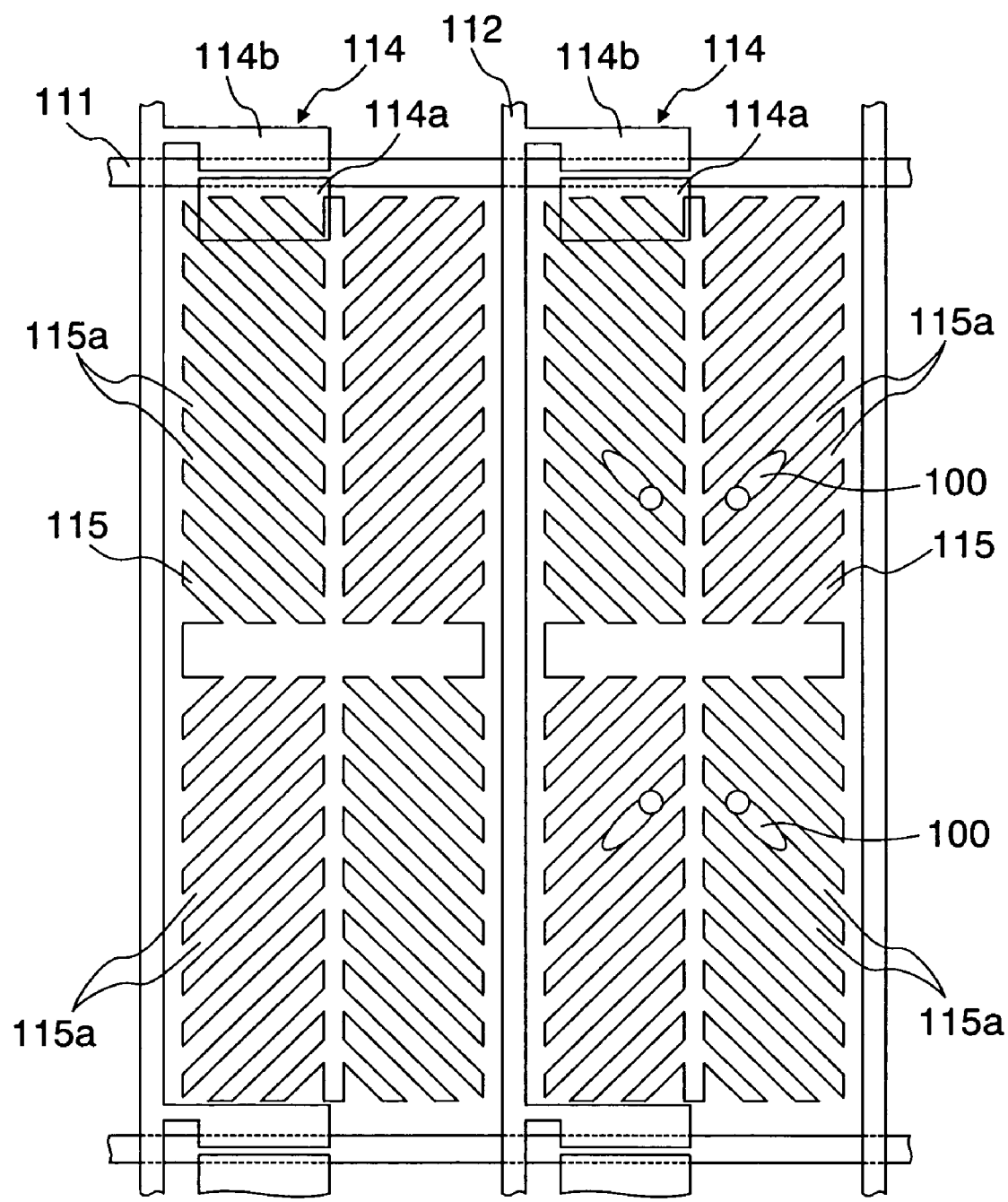
FIG. 14 is a plan view showing a TFT substrate of the liquid crystal display device of the first embodiment.

FIG. 14 is a plan view showing a region equivalent to two picture elements on the TFT substrate of this liquid crystal panel. A plurality of gate bus lines 111 extending in the horizontal direction and a plurality of data bus lines 112 extending in the vertical direction are formed on the TFT substrate. A first insulating film (a gate insulating film) is formed between the gate bus lines 111 and the data bus lines 112, whereby the gate bus lines 111 are electrically insulated from the data bus lines 112. Each rectangular region defined by the gate bus lines 111 and the data bus lines 112 constitutes a picture element region.

A TFT 114 and a picture element electrode 115 are formed in each picture element region. As shown in FIG. 14, the TFT 114 applied part of the gate bus line 111 as a gate electrode, and a source electrode 114a and a drain electrode 114b are disposed facing to each other with the gate bus line 111 interposed therebetween. The drain electrode 114b of the TFT 114 is connected to the data bus line 112, and the source electrode 114a thereof is electrically connected to the picture element electrode 115. Slits 115a are formed on the picture element electrode 115 so as to cause liquid crystal molecules to be oriented in four directions when a voltage is applied. That is, the picture element 115 is divided into a first region (an upper right region) provided with the plurality of slits 115a extending at an angle of 45° with respect to the horizontal direction, a second region (an upper left region) provided with the plurality of slits 115a extending at an angle of 135°, a third region (a lower left region) provided with the plurality of slits 115a extending at an angle of 225°, and a fourth region (a lower right region) provided with the plurality of slits 115a extending at an angle of 315°. Each slit 115a has a width of 3 μm, and each interval between any closest two slits 115a is also equal to 3 μm. As schematically shown in FIG. 14, liquid crystal molecules 100 are inclined in the directions of the slits 115a upon application of a voltage, and four domains having mutually different directions of inclinations of the liquid crystal molecules are formed in one picture element.

Meanwhile, color filters and a common electrode are formed on the counter substrate. The color filters include three types of red (R), green (G), and blue (B), and a color filter in red, green, or blue is disposed at each of the picture elements. Here, the red and green color filters have the thickness of 2 μm, and the blue color filters have the thickness of 2.8 μm.

Here, each of the TFT substrate and the counter substrate applies a glass plate having the thickness of 0.7 mm (OA-2 made by Nippon Electric Glass) as a base. Meanwhile, vertical alignment films (of a polyimide material made by JSR) are formed on surfaces of the TFT substrate and the counter substrate by use of the printing method, and the vertical alignment films are subjected to a thermal treatment at the temperature of 180° C. for 60 minutes. In addition, spacers each having the diameter of about 4.7 µm (made by Sekisui Fine Chemical) are disposed between the TFT substrate and the counter substrate. After sealing the liquid crystal, the thickness of the liquid crystal layer at the red picture elements and the green picture elements is set to 4.71 µm and the thickness of the liquid crystal layer at the blue picture elements is set to 3.73 µm.

Thereafter, the liquid crystal display device according to the embodiment having the structure as illustrated in FIG. 2 is manufactured by disposing the retardation films, which have the phase difference Rin in the in-plane direction equal to 40 nm and the phase difference Rth in the thickness direction equal to 115 nm, respectively on both sides of the liquid crystal panel configured as described above, and then disposing the polarization plates made by Sumitomo Chemical respectively on outer sides thereof.

In the meantime, as shown in FIG. 10, a liquid crystal display device was manufactured by disposing the retardation film on only one side of the liquid crystal panel and disposing the polarization plates respectively on outer sides thereof. The in-plane phase difference Rin of this retardation film is set to 80 nm and the phase difference Rth in the thickness direction is set to 230 nm.

By using the liquid crystal display devices of the embodiment and the comparative example configured as described above, chromaticity in a black display mode were measured while viewing each of the liquid crystal display devices lighted up by backlights from an the oblique direction.

Figure 15:
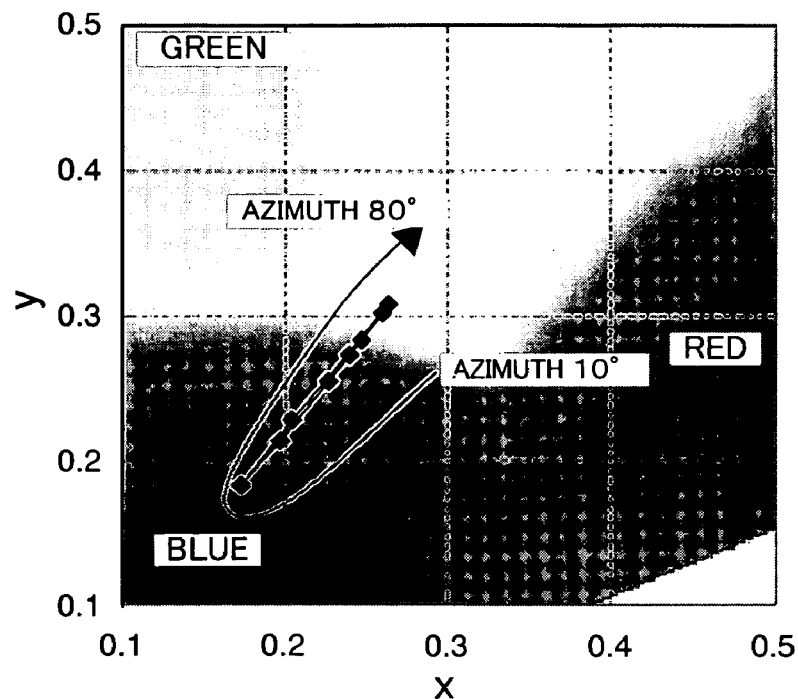
FIG. 15 is a chromaticity diagram showing chromaticity in a black display mode in the liquid crystal display device of the embodiment.
Figure 16:
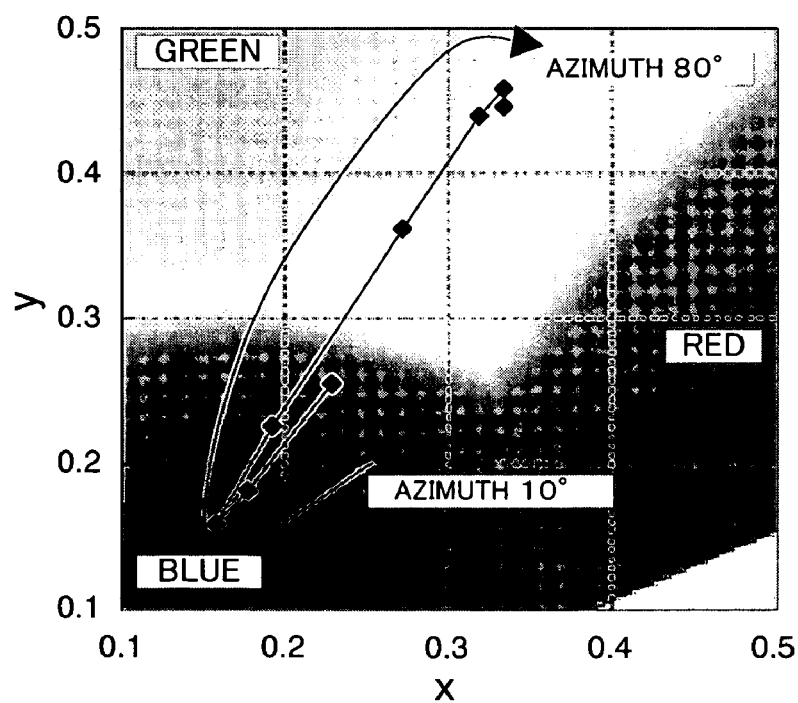
FIG. 16 is a chromaticity diagram showing chromaticity in a black display mode in the liquid crystal display device of the comparative example.

FIG. 15 is a chromaticity diagram showing a result of measurement of chromaticity at the polar angle of 70° and at the azimuth in a range from 10° to 80° in terms of the liquid crystal display device of the embodiment. Meanwhile, FIG. 16 is a chromaticity diagram showing a result of measurement of chromaticity at the polar angle of 70° and at the azimuth in a range from 10° to 80° in terms of the liquid crystal display device of the comparative example. In FIG. 15 and FIG. 16, observed color variations are plotted on CIE chromaticity diagram.

As shown in FIG. 15, in the liquid crystal display device of the embodiment, deviations of chromaticity diagram are located on a straight line and deviation widths are also small. Accordingly, it is apparent that only the strength of the blue color is changed by moving the view angle in the liquid crystal display device of the embodiment, and that it is possible to obtain favorable display quality with small color shading.

On the contrary, as shown in FIG. 16, in the liquid crystal display device of the comparative example, the chromaticity diagram is substantially deviated when changing the azimuth. Accordingly, it is apparent that a color such as green or blue is visible to the portion supposed to be in the black display mode in the liquid crystal display device of the comparative example, and that the color also varies depending on the view angle.

Second Embodiment

Figure 17:
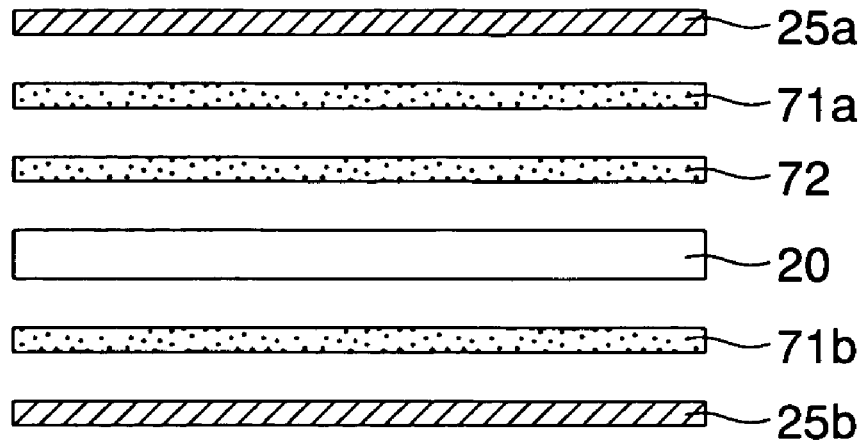
FIG. 17 is a schematic diagram showing a liquid crystal display device according to a second embodiment of the present invention.

FIG. 17 is a schematic diagram showing a liquid crystal display device according to a second embodiment of the present invention. In terms of FIG. 17, the same constituents as those illustrated in FIG. 2 are designated by the same reference numerals, and detailed description thereof will be omitted.

In this embodiment, a retardation film 72 and a retardation film 71a are sequentially disposed between the liquid crystal panel 20 and the polarization plate 25a in the above-mentioned lamination order viewed from the liquid crystal panel 20 side. Moreover, a retardation film 71b is disposed between the liquid crystal panel 20 and the polarization plate 25b. The retardation films 71a and 71b has the positive refractive index anisotropy (Nx>Ny=Nz), while the retardation film 72 has the negative refractive index anisotropy (Nx=Ny>Nz).

In the liquid crystal display device of this embodiment, it is also possible to suppress the phenomenon of coloring when viewed from an oblique direction, and thereby to obtain favorable display quality as similar to the first embodiment.

Figure 18:
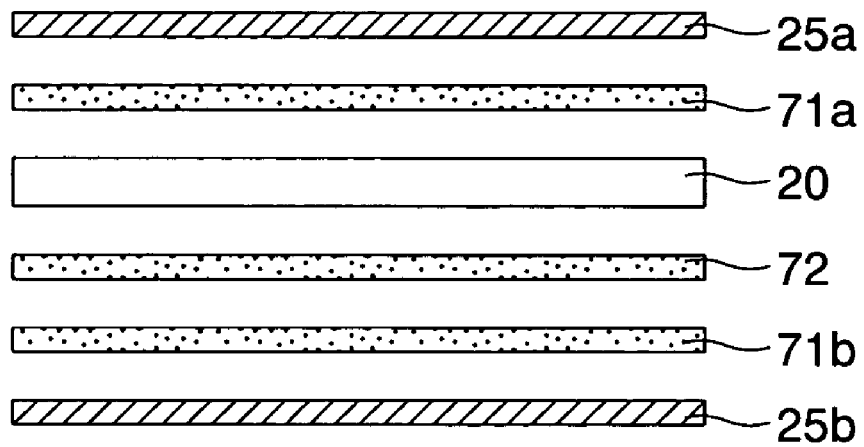
FIG. 18 is a schematic diagram showing a liquid crystal display device of a modified example of the second embodiment.

Here, as shown in FIG. 18, it is also possible to obtain a similar effect by disposing the retardation film 72 having the negative refractive index anisotropy between the retardation film 71 and the liquid crystal panel 20.

What is claimed is:

1. A liquid crystal display device comprising:
  a liquid crystal panel in which thicknesses of a liquid crystal layer are set up depending on colors of color filters;
  first and second polarization plates disposed so as to interpose the liquid crystal panel;
  a first retardation film disposed between the liquid crystal panel and the first polarization plate; and
  a second retardation film disposed between the liquid crystal panel and the second polarization plate;
  wherein, assuming that a maximum value of a refractive index in an in-plane direction out of principal indices of refraction is Nx, that a refractive index in an orthogonal direction to the direction of the refractive index which has the value of Nx is Ny, and that a thickness is d, the first and second retardation films are set to satisfy a difference in values of $(Nx-Ny) \times d$ equal to or less than 10 nm,
  absorption axes of the first and second polarization plates are disposed orthogonally to each other,
  a slow axis of the first retardation film is disposed orthogonally to the absorption axis of the first polarization plate,
  a slow axis of the second retardation film is disposed orthogonally to the absorption axis of the second polarization plate,
  the liquid crystal panel comprises a pair of substrates, and liquid crystal having negative dielectric constant anisotropy which is sealed between the substrates,
  wherein three types of color filters in red, green, and blue are provided as the color filters,
  wherein a thickness of a liquid crystal layer at a portion where the red color filter is formed is greater than a thickness of the liquid crystal layer at a portion where the blue color filter is formed, and wherein the thickness of the liquid crystal layer at the portion where the red color filter is formed is equal to a thickness of the liquid crystal layer at a portion where the green color filter is formed.

2. The liquid crystal display device according to claim 1, wherein a thin film transistor and a picture element electrode connected to the thin film transistor are formed for each picture element on one of the pair of substrates, and a common electrode opposed to the picture element electrode is formed on the other substrate.

3. The liquid crystal display device according to claim 1, wherein, assuming that a refractive index in a thickness direction is Nz, the first and second retardation films respectively satisfy a relation of Nx>Ny=Nz.

4. The liquid crystal display device according to claim 3, wherein a third retardation film satisfying a relation of Nx=Ny>Nz is disposed between the liquid crystal panel and the first retardation film.

5. The liquid crystal display device according to claim 3, wherein a third retardation film satisfying a relation of Nx=Ny>Nz is disposed between the liquid crystal panel and the second retardation film.

6. The liquid crystal display device according to claim 1, wherein at least any one of the first and second retardation films is an assembly of a plurality of layers having refractive index anisotropies.

* * * * *